United States Patent
Zhu

(10) Patent No.: US 10,182,125 B2
(45) Date of Patent: Jan. 15, 2019

(54) SERVER, PHYSICAL SWITCH AND COMMUNICATION SYSTEM

(71) Applicant: Lenovo Enterprise Solutions (Singapore) Pte. Ltd., Singapore (SG)

(72) Inventor: Zhengdong Zhu, Wuxi (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 195 days.

(21) Appl. No.: 15/163,940

(22) Filed: May 25, 2016

(65) Prior Publication Data
US 2016/0380833 A1 Dec. 29, 2016

(30) Foreign Application Priority Data

Jun. 23, 2015 (CN) .......................... 2015 1 0350870

(51) Int. Cl.
*H04L 29/08* (2006.01)
*H04L 12/46* (2006.01)
*H04L 12/24* (2006.01)

(52) U.S. Cl.
CPC .......... *H04L 67/28* (2013.01); *H04L 12/4633* (2013.01); *H04L 12/4641* (2013.01); *H04L 67/2814* (2013.01); *H04L 41/0803* (2013.01)

(58) Field of Classification Search
CPC ....................................................... H04L 49/70
See application file for complete search history.

(56) References Cited

U.S. PATENT DOCUMENTS

| | | | |
|---|---|---|---|
| 7,697,515 B2* | 4/2010 | Ofer ...................... | G06F 3/0605 370/389 |
| 7,697,554 B1* | 4/2010 | Ofer .................. | H04L 29/12594 370/381 |
| 8,626,967 B1* | 1/2014 | Naik ........................ | G06F 13/14 710/31 |
| 8,949,656 B1* | 2/2015 | Ninan ................. | G06F 11/2005 714/4.1 |
| 9,264,362 B2* | 2/2016 | Hwang .................... | H04L 47/12 |
| 9,348,530 B2* | 5/2016 | Madnani ............... | G06F 3/0605 |
| 9,715,403 B2* | 7/2017 | van Riel ............. | G06F 9/45558 |
| 9,838,339 B2* | 12/2017 | Lambeth ................. | H04L 49/70 |

(Continued)

*Primary Examiner* — Jimmy H Tran
(74) *Attorney, Agent, or Firm* — Jeffrey L. Streets

(57) ABSTRACT

A server, physical switch, and communication system are provided. The server includes one or more virtual machines and a proxy module. The proxy module includes a registering module configured to register the virtual machines to a physical switch, a message receiving confirmation module configured to receive a confirmation message from the physical switch, wherein the confirmation message comprises identification information associated with the virtual machines, and a server end forwarding module configured to communicate with the physical switch based on the identification information associated with the virtual machines. The physical switch includes a virtual port assigning module configured to register a virtual machine to the physical switch, a message sending confirmation module configured to send a confirmation message to a server, and a physical switch end forwarding module configured to communicate with the virtual machine based on the identification information associated with the virtual machine.

12 Claims, 6 Drawing Sheets

(56) References Cited

U.S. PATENT DOCUMENTS

| | | | |
|---|---|---|---|
| 2002/0131397 A1* | 9/2002 | Patel | H04W 48/10 370/349 |
| 2007/0208836 A1* | 9/2007 | Madnani | G06F 3/0605 709/223 |
| 2007/0263637 A1* | 11/2007 | Madnani | G06F 3/0605 370/396 |
| 2007/0283186 A1* | 12/2007 | Madnani | G06F 3/0617 714/6.2 |
| 2007/0288224 A1* | 12/2007 | Sundarrajan | G06F 9/5072 703/22 |
| 2011/0299424 A1* | 12/2011 | Rikitake | H04L 12/4625 370/254 |
| 2012/0246282 A1* | 9/2012 | Oguchi | H04L 12/66 709/221 |
| 2015/0109923 A1* | 4/2015 | Hwang | H04L 47/12 370/235 |
| 2016/0028658 A1* | 1/2016 | Lambeth | H04L 29/12839 718/1 |
| 2016/0253196 A1* | 9/2016 | van Riel | G06F 9/45558 718/1 |
| 2017/0331884 A1* | 11/2017 | Colle | H04L 41/0668 |

* cited by examiner

| Special destination MAC | Operation code | Virtual network interface card ID | Virtual network interface card name | Virtual port ID | Encapsulation mode |
|---|---|---|---|---|---|
| | | | | | |

SERVER, PHYSICAL SWITCH AND COMMUNICATION SYSTEM

CROSS-REFERENCE TO RELATED APPLICATIONS

This application claims priority under 35 U.S.C. § 119 to Chinese Patent Application No. 201510350870.6 filed Jun. 23, 2015, the entire text of which is specifically incorporated by reference herein.

BACKGROUND

Field of the Invention

The present invention relates to the field of communications. In particular, the present invention relates to a server, a physical switch and a communication system for use in communication between virtual machines.

Background of the Related Art

System virtualization is a process of hiding bottom-layer physical hardware in a specific manner, such that a plurality of operating systems can share the physical hardware. In a typical system virtualization environment, a virtual machine management program (hypervisor) is responsible for coordinating access to all the physical devices and virtual machines on a server. A plurality of virtual machines may be present on one server, and these virtual machines may need to communicate with each other. However, different from the interconnection between the common physical devices via an entity network device, the network interfaces of the virtual machine are also virtualized, and therefore the interconnection between the network interfaces may not be directly implemented via the entity network device.

One currently prevailing solution is to virtualize the network device with reference to the implementation manner of the virtual machine, and bind the network device to the server. As such, the network interfaces on the virtual machine may be directly interconnected inside the virtual machine via such a virtual network device as a virtual switch and the like, with no need of the entity network device.

Similar to a common server, each virtual machine has its own virtual network card (vNIC), wherein each vNIC has its own MAC address and IP address. The virtual switch is equivalent to a virtual two-layer switch, and has its own virtual port. The virtual switch is connected to a virtual network card and a physical network card, and sends out data packets from the virtual machine on the physical network card.

However, tens of virtual machines may run on the same server. Therefore, a server may generate a significant load on the network. In addition, since the virtual switch is merely practiced via software, the functionality and performance of the virtual switch is incomparable to a traditional entity network device.

Further, in terms of management rights, a network manager substantially fails to manage all the virtual switches, and a host manager is also unwilling to spend too much time in network configuration. As a result, the virtual switch is freely outside the entire management of the network, which is unfavorable to implementation of the entire network policy and network security.

In addition, in a modern data center, more and more virtual switches are being deployed in a virtual machine management program of a private or public cloud solution. The virtual machine nested in the virtual machine management program is similar to a physical switch, and is configured to transmit packets between the virtual machines. A data center may have thousands of servers, which indicates the possibility that thousands of virtual switches may be deployed and managed. Compared with the traditional data center, this may increase the asset cost and operation cost. With respect to new cloud demands, such as software defined network (SDN) practice and the like, the virtual switch becomes more and more complicated, which may occupy more server resources and reduce the performance of the server.

At present, the SDN may reduce the operating cost when a large number of virtual switches are deployed. However, the SDN still has various drawbacks. Firstly, with respect to support of the SDN function, the virtual switch is still complicated, and may consume a significant amount of server resources (CPU/memory). Secondly, the asset cost is not reduced. Thirdly, although SDN centralized management may simplify the overall management, the SDN controller must handle a huge workload in order to manage a large number of virtual switches. Fourthly, the SDN is a new technology, and thus many users lack confidence in use of the technology.

BRIEF SUMMARY

One embodiment of the present invention provides a server. The server comprises one or more virtual machines and a proxy module. The proxy module comprises a registering module configured to register the one or more virtual machines to a physical switch, a message receiving confirmation module configured to receive a confirmation message from the physical switch, wherein the confirmation message comprises identification information associated with the one or more virtual machines, and a server end forwarding module configured to communicate with the physical switch based on the identification information associated with the one or more virtual machines.

Another embodiment of the present invention provides a physical switch. The physical switch comprises a virtual port assigning module configured to register a virtual machine to the physical switch, a message sending confirmation module configured to send a confirmation message to a server, wherein the confirmation message comprises identification information associated with the virtual machine, and a physical switch end forwarding module configured to communicate with the virtual machine based on the identification information associated with the virtual machine.

Yet another embodiment of the present invention provides a communication system. The communication system comprises a server and a physical switch, wherein the server comprises one or more virtual machines and a proxy module. The proxy module comprises a registering module configured to register the one or more virtual machines to a physical switch, a message receiving confirmation module configured to receive a confirmation message from the physical switch, wherein the confirmation message comprises identification information associated with the one or more virtual machines, and a server end forwarding module configured to communicate with the physical switch based on the identification information associated with the one or more virtual machines. The physical switch comprises a virtual port assigning module configured to register the one or more virtual machines to the physical switch, a message sending confirmation module configured to send a confirmation message to the server, and a physical switch end forwarding module configured to communicate with the server based on the identification information associated with the one or more virtual machines.

BRIEF DESCRIPTION OF THE SEVERAL VIEWS OF THE DRAWINGS

The exemplary embodiments of the present invention are described in more detail with reference to the accompanying drawings. With illustration using the exemplary embodiments, the above and other objectives, features and advantages of the present invention would become more apparent. In the exemplary embodiments of the present invention, like reference numerals generally represent like parts.

DETAILED DESCRIPTION

Figure 1:
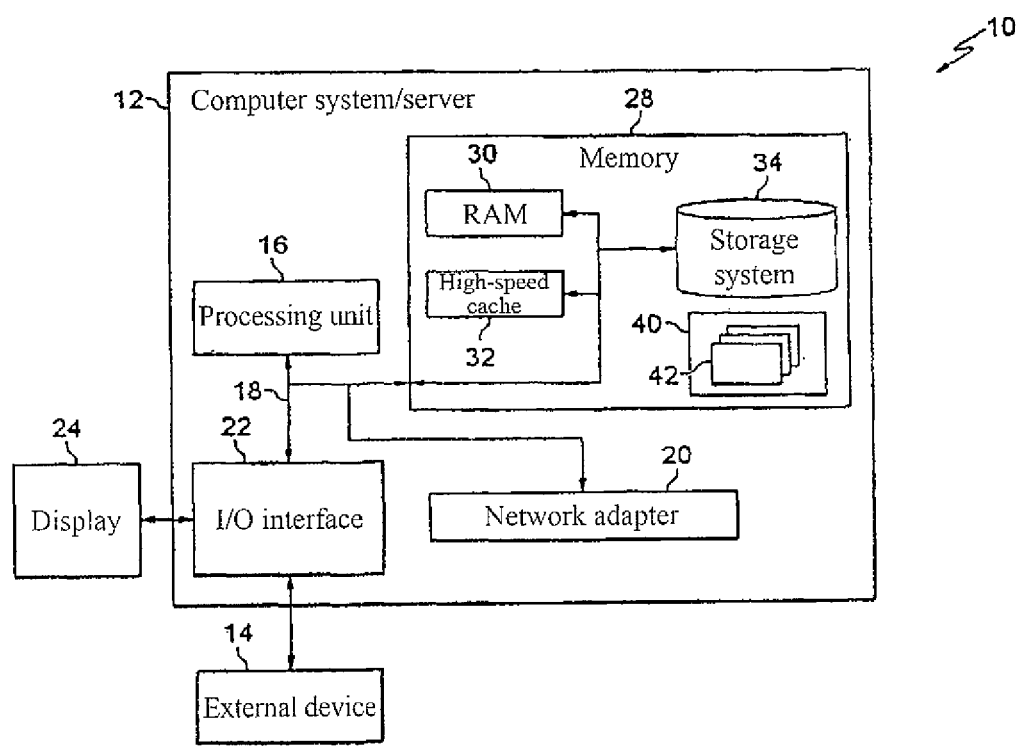
FIG. 1 is a block diagram of a computer system/server suitable for practicing the embodiments of the present invention.

One embodiment of the present invention provides a server. The server comprises one or more virtual machines and a proxy module. The proxy module comprises a registering module configured to register the one or more virtual machines to a physical switch, a message receiving confirmation module configured to receive a confirmation message from the physical switch, wherein the confirmation message comprises identification information associated with the one or more virtual machines, and a server end forwarding module configured to communicate with the physical switch based on the identification information associated with the one or more virtual machines.

Another embodiment of the present invention provides a physical switch. The physical switch comprises a virtual port assigning module configured to register a virtual machine to the physical switch, a message sending confirmation module configured to send a confirmation message to a server, wherein the confirmation message comprises identification information associated with the virtual machine, and a physical switch end forwarding module configured to communicate with the virtual machine based on the identification information associated with the virtual machine.

Yet another embodiment of the present invention provides a communication system. The communication system comprises a server and a physical switch, wherein the server comprises one or more virtual machines and a proxy module. The proxy module comprises a registering module configured to register the one or more virtual machines to a physical switch, a message receiving confirmation module configured to receive a confirmation message from the physical switch, wherein the confirmation message comprises identification information associated with the one or more virtual machines, and a server end forwarding module configured to communicate with the physical switch based on the identification information associated with the one or more virtual machines. The physical switch comprises a virtual port assigning module configured to register the one or more virtual machines to the physical switch, a message sending confirmation module configured to send a confirmation message to the server, and a physical switch end forwarding module configured to communicate with the server based on the identification information associated with the one or more virtual machines.

One or more embodiments of the present invention may avoid the problem that server resources are occupied and service performance is affected due to implementation of a virtual switch on a server. One or more embodiments may also carry out the overall network policy and network security in a more simplified manner. Furthermore, one or more embodiments may avoid extra assets cost and operation cost. Still further, one or more embodiments may implement communication between virtual machines in a manner which is simpler than the manner of implementing the virtual switch on the server.

Various non-limiting embodiments of the present invention are hereinafter described in detail with reference to the accompanying drawings, and thus other features and advantages of the present invention would become more apparent. Although the accompanying drawings illustrate only certain embodiments of the present invention, it shall be understood that the present invention may be practiced in various other manners, and the present invention is not limited to the embodiments illustrated herein. To the contrary, these embodiments are described herein only for the purpose of increasing an understanding of the present invention, and may better convey the scope of the present invention to a person skilled in the art. A person of ordinary skill in the art will understand that various features illustrated and described in any of the accompanying drawings may all be combined with one or more features illustrated in the other drawings, to derive an embodiment which is not implicitly illustrated or described. The illustrated combination of features provides a representative embodiment in a typical application. However, combinations and modifications compliant with the teachings given in the present invention may be expectedly applied to specific applications and practice.

It should be noted that like reference numerals and letters represent similar parts in the following accompanying drawings. Therefore, once a part has been defined in one accompanying drawing, in the subsequent drawings, the same part may not be discussed again.

FIG. 1 is a block diagram of one example of a computer system/server 12 that is suitable for practicing embodiments of the present invention. However, the illustrated computer system/server 12 shall cause no limitation to the functions and application scope of the embodiments of the present invention.

As illustrated in FIG. 1, the computer system/server 12 may be embodied in a conventional computing device. The components of the computer system/server 12 may include, but are not limited to, one or more processors or processing units 16, a system memory 28 and a bus 18 connecting different system components (including the system memory 28 and the processing unit 16).

The bus 18 represents one or more of several types of bus structures, including a memory bus or a memory controller, a peripheral bus, a graphic accelerating port, a processor or a local bus using any one of the several bus structures. For example, these system structures include, but are not limited to, an industrial standard architecture (ISA) bus, a micro channel architecture (MCA) bus, an enhanced ISA bus, a Video Electronics Standards Association (VESA) local bus, and a peripheral component interconnect (PCI) bus.

The computer system/server 12 typically includes a plurality of types of computer system-readable media. These media may be any available media that can be accessed by the computer system/server 12, including volatile and non-volatile media, and removable and immovable media.

The system memory 28 may include computer system-readable media in the form of volatile memory, for example, a random access memory (RAM) 30 and/or a high-speed cache memory 32. The computer system/server 12 may further comprise other movable or immovable, and volatile or non-volatile, computer system storage media. For example, the storage system 34 may be configured to read an immovable and non-volatile magnetic media (not illustrated in FIG. 1, which is generally referred to as a "hard disk drive") for use in reading and writing. Although the immovable and non-volatile magnetic media are not illustrated in FIG. 1, a magnetic disk drive which is capable of reading and writing data from the removable and non-volatile magnetic disk (for example, a "floppy disk"), and an optical disk drive which is capable of reading and writing data from the movable and non-volatile optical disk (for example, a CD-ROM, a DVD-ROM or other optical media) may be provided. Under such circumstances, each drive may be connected to the bus 18 via one or more data media interfaces. The memory 28 may store at least one program product, wherein the program product has a group (for example, at least one) of program modules. These program modules are configured to implement the functions of various embodiments of the present invention.

A program/practical tool 40 having a group (at least one) of program modules 42 may be stored in, for example, the memory 28, and such program modules 42 may include, but not limited to, an operating system, one or more application programs, other program modules and program data. In these examples, each example or a specific combination of examples may involve implementation of a network environment. The program modules 42 may generally perform the functions and/or methods in the embodiments of the present invention.

The computer system/server 12 may also communicate with one or more external devices 14 (for example, a keyboard, a pointer device, a display 24 and the like), or may communicate with one or more devices which are capable of enabling a user to interact with the computer system/server 12, and/or communicate with any device (for example, a network card, a modem and the like) which is capable of enabling the computer system/server 12 to communicate with one or more other devices. Such communication may be conducted via an input/output (I/O) interface 22. In addition, the computer system/server 12 may also communicate with one or more networks (for example, a local area network (LAN), a wide area network (WAN and/or a public network, for example, the Internet) via a network adapter 20. As illustrated in FIG. 1, the network adapter 20 communicates with other modules of the computer system/server 12 via the bus 18. It should be understood that although not illustrated in the drawings, the computer system/server 12 may use other hardware and/or software modules, which include, but not limited to: a micro code, a device drive, a redundancy processing unit, an external magnetic disk drive array, a RAID system, a magnetic tape drive, a data backup storage system and the like.

Specific embodiments and examples of the present invention are hereinafter described with reference to the accompanying drawings. In the description of the specific embodiments and examples, the duplicate portions may be omitted.

Figure 2:
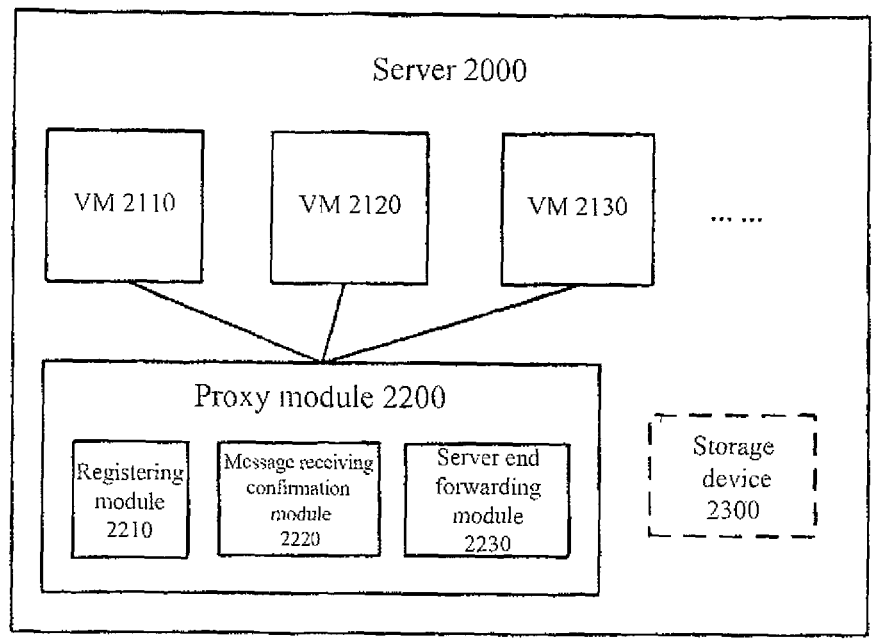
FIG. 2 is a block diagram of a server according to an embodiment of the present invention.

FIG. 2 is a block diagram of one example of a server 2000 according to an embodiment of the present invention. In this example, the server 2000 may comprise one or more virtual machines 2110, 2120, 2130 . . . , and a proxy module 2200. In one embodiment, the proxy module 2200 may be configured in a virtual machine management program (not illustrated in the drawings). The proxy module 2200 may comprise a registering module 2210, a message receiving confirmation module 2220 and a server end forwarding module 2230.

The registering module 2210 registers the virtual machine to the physical switch when any one of the virtual machines 2110, 2120, 2130 . . . go online via access with the physical switch. The message receiving confirmation module 2220 is configured to receive a confirmation message from the physical switch in response to registering the virtual machine, wherein the confirmation message comprises identification information associated with the one or more virtual machines. The server end forwarding module 2230 is configured to communicate with the physical switch based on the identification information associated with the one or more virtual machines.

In one embodiment, the identification information is associated with the virtual port identifier (ID) assigned to the one or more virtual machines. For example, the identification information may comprise the virtual port ID assigned to the one or more virtual machines.

The process of registering the virtual machine may be practiced by means of sending a packet to the physical switch, or may be practiced by means of sending a registration message to the physical switch via the registering module 2210. In one embodiment, when the physical switch receives a packet from a virtual machine, the virtual machine is checked to determine whether the virtual machine has been registered. If the virtual machine has not been registered, the virtual machine is registered to the physical switch. If the virtual machine has been previously registered, the registration process is not performed.

Each individual virtual machine may have one or more virtual network cards, and each virtual network card may have a universally unique identifier, a MAC address and an IP address. In one embodiment, the registering module of a virtual machine sends a registration message comprising a virtual network card identifier (ID) to the physical switch, such that respective virtual network card IDs of the one or more virtual machines 2110, 2120, 2130 . . . will become registered to the physical switch. The virtual network card ID may be any one of a universally unique identifier, an MAC address and an IP address, and is used to uniquely identify a virtual network card.

In one embodiment, the confirmation message received by the confirmation message receiving module 2220 from the physical switch further comprises a virtual network card ID of the virtual machine, which indicates which virtual machine has been registered to the physical switch. The confirmation message may also not comprise a virtual network card ID. In such a case, it is defaulted that the confirmation message indicates that the virtual machine in the recent registration process has been successfully registered.

In one embodiment, the server 2000 may further comprise a data storage device 2300. The registering module 2210 may associate the virtual network card ID of the virtual machine with the virtual port ID assigned to the virtual machine and store the association in the storage device 2300. Accordingly, in the subsequent packet forwarding process, the associated virtual network card ID may be searched based on the virtual port ID, and the associated virtual port ID may be searched based on the virtual network card ID. Although the storage device 2300 as illustrated in FIG. 2 is comprised in the server 2000, a person skilled in the art will understand that the data storage device 2300 may also be an external storage device communicatively connected to the server 2000, or a storage device which may be remotely accessed by the server 2000.

In one embodiment, when the virtual machine goes offline, the registering module 2210 may send a deregistration message to the physical switch to deregister the to-be-deleted virtual machine. Accordingly, the physical switch is capable of removing the virtual port assigned to the virtual machine, and releasing the virtual port ID. As such, more available system resources may be obtained.

Figure 9A:
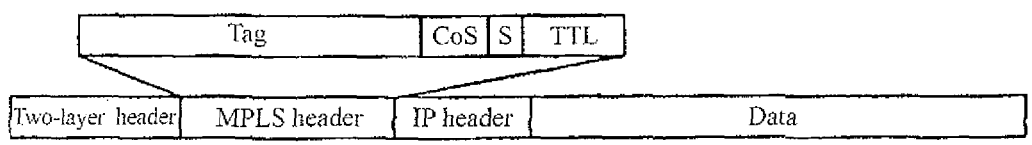
FIG. 9A and FIG. 9B illustrate a packet encapsulation structure according to an embodiment of the present invention.
Figure 9B:
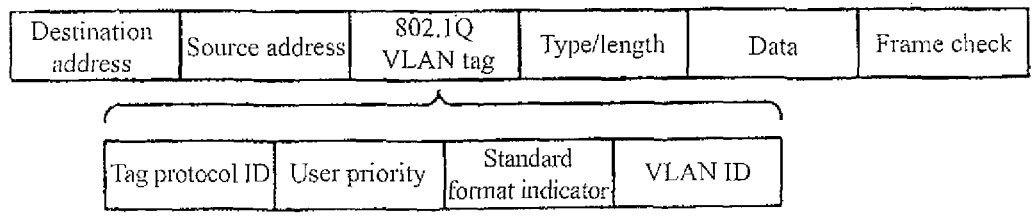

The registration message, the deregistration message and the confirmation message may be defined to employ the same format. For example, the registration message, the deregistration message and the confirmation message may all employ a format as illustrated in FIG. 9A and FIG. 9B described hereinafter.

In one embodiment, when the server end forwarding module 2230 receives an original packet from the virtual machine, the server end forwarding module 2230 may encapsulate the original packet, and then send the encapsulated packet to the physical switch, wherein the encapsulated packet may comprise the virtual port ID assigned to the virtual machine. In one embodiment, the server end forwarding module 2230 may search in the storage device 2300 a virtual port ID associated with the virtual network card ID of the virtual machine, and then encapsulate the original packet based on the searched virtual port ID.

In one embodiment, when the server end forwarding module 2230 receives a packet from the physical switch, the server end forwarding module 2230 may decapsulate the received packet to obtain a virtual port ID, and forward the decapsulated packet to a corresponding virtual machine based on the virtual port ID obtained via the decapsulation. In one embodiment, the server end forwarding module 2230 may search in the storage device 2300 a virtual network card ID associated with the virtual port ID, and then forward the searched virtual network card ID to a corresponding virtual machine.

In one embodiment, the confirmation message may comprise information indicative of an encapsulation mode, and the server end forwarding module 2230 may encapsulate the original packet in the encapsulation mode indicated in the acknowledgement message. For example, the encapsulation mode for encapsulating the original packet may be selected from multiprotocol label switching (MPLS), virtual local area network (VLAN), and a private format.

Figure 3:
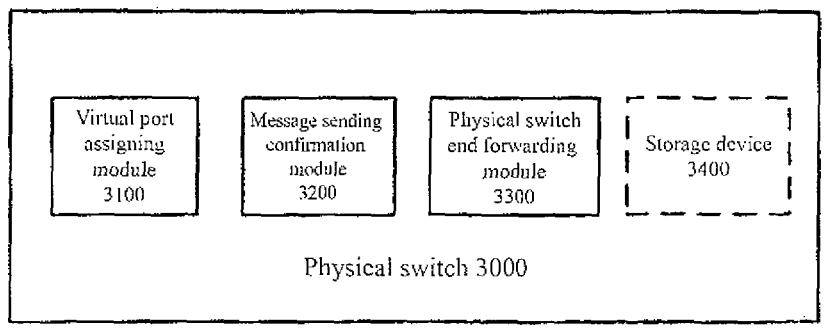
FIG. 3 is a block diagram of a physical switch according to an embodiment of the present invention.

FIG. 3 is a block diagram of a physical switch 3000 according to an embodiment of the present invention. As illustrated, the physical switch 3000 may comprise a virtual port assigning module 3100, a message sending confirmation module 3200 and a physical switch end forwarding module 3300.

The virtual port assigning module 3100 may be configured to register a virtual machine to the physical switch 3000. The message sending confirmation module 3200 may be configured to send a confirmation message to a server, wherein the confirmation message comprises identification information associated with the virtual machine. The physical switch end forwarding module 3300 may be configured to communicate with the virtual machine based on the identification information associated with the virtual machine.

In one embodiment, the identification information is associated with a virtual port ID assigned to the virtual machine. For example, the identification information may comprise the virtual port ID assigned to the one or more virtual machines.

In one embodiment, when the physical switch 3000 receives a packet from a virtual machine, the virtual machine is checked to determine whether the virtual machine 3000 has been registered. If the virtual machine has not been registered, the virtual machine is registered to the physical switch 3000. If the virtual machine has been registered, the registration process is not performed. In one embodiment, when the physical switch 3000 receives a registration message from the server, the physical switch 3000 may register the virtual machine indicated in the registration message.

A virtual machine communicating with the physical switch may have one or more virtual network cards (not illustrated in the drawings), and each virtual network card may have a universally unique identifier, a MAC address and an IP address. In one embodiment, the virtual port assigning module 3100 may receive a registration message comprising a virtual network card ID from the server, and assign a virtual port to a network card of the virtual machine based on the virtual network card ID. The virtual network card ID may be any one of a universally unique identifier, an MAC address and an IP address, and is used to uniquely identify a virtual network card.

In one embodiment, the confirmation message sent by the confirmation message sending module 3200 to the server may further comprise a virtual network card ID of the virtual machine, which indicates which virtual machine has been registered to the physical switch. The confirmation message may also not comprise a virtual network card ID. In such a case, it is defaulted that the confirmation message indicates that the virtual machine in the recent registration process has been successfully registered.

In one embodiment, the physical switch 3000 may further comprise a data storage device 3400. When the virtual port assigning module 3100 receives the registration message comprising the virtual network card ID of the virtual machine from the server, the virtual port assigning module 3100 associates the virtual network card ID of the virtual machine with the virtual port ID assigned to the virtual machine and stores the association in the storage device 3400. Therefore, the data stored on the data storage device 3400 allow the physical switch to search the associated network card ID based on the virtual port ID and search the virtual port ID based on the virtual network card ID in the subsequent packet forwarding process. Although the data storage device 3400 as illustrated in FIG. 3 is included within the physical switch 3000, a person skilled in the art will understand that the data storage device 3400 may also be an external storage device communicatively connected to the physical switch 3000, or a storage device which may be remotely accessed by the physical switch 3000.

In one embodiment, the physical switch end forwarding module 3300 may determine a destination of a received packet. When the received packet is a packet to be sent to a virtual machine, the physical switch end forwarding module 3000 may encapsulate the packet based on the virtual port ID of the virtual machine. Alternatively, when the received packet is not a packet to be sent to a virtual machine, the physical switch end forwarding module 3300 directly forwards the packet. In this manner, the physical switch 3000 may be connected to other network-connected devices, such as a personal computer, a smart phone, a PDA and the like in addition to the server according to the present invention. Accordingly, the physical switch not only implements communication between the virtual machines on the server according to the present invention and communications between the servers, but also implements communication between the server according to the present invention and any network-connected devices in the prior art.

In one embodiment, the confirmation message may further comprise information indicative of an encapsulation mode. The encapsulation mode may be selected from multiprotocol label switching (MPLS), virtual local area network (VLAN), and a private format.

In one embodiment, the virtual port assigning module 3100 may, when receiving a deregistration message of the virtual machine, remove the virtual port associated with the virtual machine, and release the virtual port ID assigned to the virtual machine. As such, more available system resources may be obtained.

Figure 4:
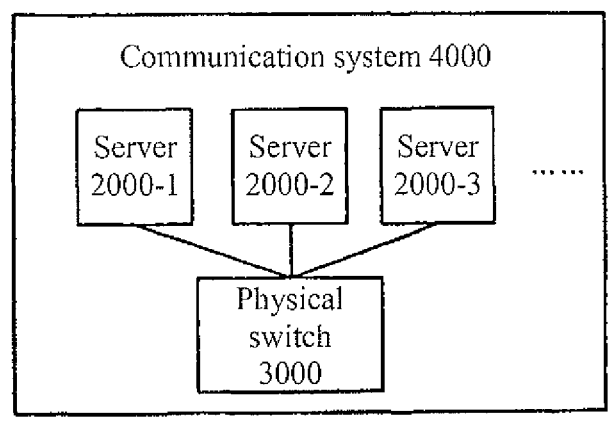
FIG. 4 is a block diagram of a communication system according to an embodiment of the present invention.

FIG. 4 is a block diagram of a communication system 4000 according to an embodiment of the present invention. As illustrated, the communication system 4000 may comprise one or more servers 2000-1, 2000-2, 2000-3 . . . , and the physical switch 3000 as illustrated in FIG. 3.

In particular, each of the servers 2000-1, 2000-2, 2000-3 . . . may comprise one or more virtual machines and a proxy module. The proxy module may comprise a registering module, a message receiving confirmation module and a server end forwarding module. The registering module may be configured to register the one or more virtual machines to a physical switch. The message receiving confirmation module may be configured to receive a confirmation message from the physical switch, wherein the confirmation message comprises identification information associated with the one or more virtual machines. The server end forwarding module may be configured to communicate with the physical switch based on the identification information associated with the one or more virtual machines. The physical switch 3000 may comprise a virtual port assigning module, a message sending confirmation module and a physical switch end forwarding module. The virtual port assigning module may be configured to register the one or more virtual machines to the physical switch. The message sending confirmation module may be configured to send a confirmation message to the server. The physical switch end forwarding module may be configured to communicate with the server based on the identification information associated with the one or more virtual machines.

In addition, the physical switch 3000 may also be connected to other network-connected devices such as a personal computer, a smart phone, a PDA and the like in addition to the servers.

In one embodiment, the identification information is associated with a virtual port ID assigned to the virtual machine. For example, the identification information may comprise the virtual port ID assigned to the one or more virtual machines.

In one embodiment, the registration module may be configured to send a registration message comprising a virtual network card ID to the physical switch, such that a virtual network card of the one or more virtual machines is registered to the physical switch through the virtual network card ID. The virtual port assigning module may be configured to assign a virtual port to a virtual network card of the virtual machine according to a virtual network card ID.

In one embodiment, the server end forwarding module may be further configured to encapsulate an original packet received from a virtual machine, wherein the encapsulated packet comprises the virtual port ID assigned to the virtual machine. In addition, the physical switch end forwarding module may be further configured to, when a received packet is a packet to be sent to a virtual machine, encapsulate the packet based on the virtual port ID of the virtual machine.

In one embodiment, the server end forwarding module may be further configured to decapsulate a packet received from the physical switch to obtain a virtual port ID, and forward the decapsulated packet to a corresponding virtual machine based on the virtual port ID obtained via the decapsulation.

In one embodiment, the registering module may be further configured to send a deregistration message to the physical switch to deregister a deleted virtual machine, and the virtual port assigning module may be further configured to, when receiving a deregistration message of the virtual machine, remove the virtual port associated with the virtual machine, and release the virtual port ID assigned to the virtual machine.

In accordance with various embodiments of the present invention, the physical switch assigns a virtual port to a virtual machine, and the server communicates with the physical switch based on the virtual port ID of the assigned virtual port. This manner is advantageous in that the physical switch is capable of taking the virtual port as a physical port, and forwarding a packet from the virtual machine between the ports according to a predetermined forwarding rule in the physical switch. As such, system complexity of the server and the physical switch is reduced. In addition, similar to the physical port, a user may add the virtual port to a VLAN, and apply any network policy to the virtual port.

In addition, under the circumstance where two virtual machines on the same server communicate with each other, when the physical switch receives a packet from the server, the physical switch may forward the packet back to the same server.

Subsequently, with reference to FIG. 2 and FIG. 4, exemplary registration, deregistration and packet forwarding processes in the communication system 4000 according to the embodiments of the present invention are hereinafter described in detail.

Figure 5:
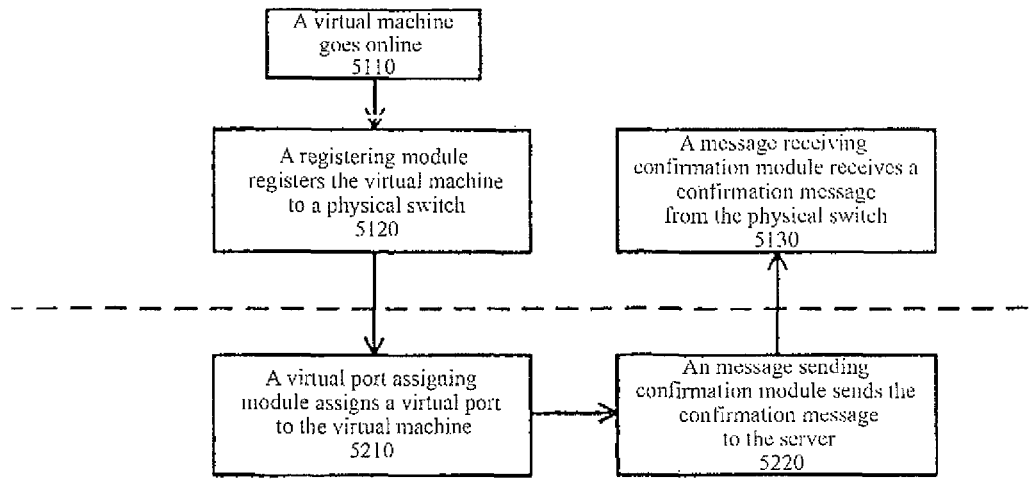
FIG. 5 is a flowchart of a registration process in a server and a physical switch according to an embodiment of the present invention.

FIG. 5 is a flowchart of a registration process in a server and a physical switch according to an embodiment of the present invention. As illustrated, in step 5110, in the server 2000 (see FIG. 2), a new virtual machine goes online, or a new virtual machine is added.

Subsequently, in step 5120, the registering module 2210 in the server 2000 (see FIG. 2) registers the virtual machine to the physical switch 3000 (see FIG. 3). The process of registering the virtual machine may be practiced by means of sending a packet to the physical switch, or may be practiced by means of sending a registration message to the physical switch via the registering module 2210 (see FIG. 2). One virtual machine may have one or more virtual network cards (not illustrated in the drawings), and each virtual network card may have a universally unique identifier, a MAC address and an IP address. In one embodiment, the registering module sends a registration message comprising a virtual network card ID to the physical switch, such that the virtual network card of the virtual machine is registered to the physical switch via the virtual network card ID. The virtual network card ID is any one of a universally unique identifier, an MAC address and an IP address, and is used to uniquely identify a virtual network card.

Subsequently, in step 5210, the virtual port assigning module 3100 in the physical switch 3000 (see FIG. 3) assigns a virtual port to the virtual machine in response to registering the virtual machine by the server 2000 to the physical switch 3000. In one embodiment, when the physical switch 3000 receives a packet from a virtual machine, the virtual machine is checked to determine whether the virtual machine has been registered. If the virtual machine has not been registered, the virtual machine is registered to the physical switch. If the virtual machine has previously been registered, the registration process is not performed. In one embodiment, when the physical switch receives a registration message from the server, the physical switch may register the virtual machine indicated in the registration message. In one embodiment, the virtual port assigning module 3100 may receive a registration message comprising a virtual network card ID from the server, and assign identification information, for example, a virtual port, to a virtual network card of the virtual machine based on the virtual network card ID.

Subsequently, in step 5220, the confirmation message sending module 3200 in the physical switch 3000 (see FIG. 3) sends a confirmation message to the server 2000, wherein the confirmation message comprises a virtual port ID of the virtual port. In one embodiment, the confirmation message sent by the message sending confirmation module 3200 to the server further comprises a virtual network card ID of the virtual machine, which indicates which virtual machine has been registered to the physical switch. The confirmation message may also not comprise a virtual network card ID. In such a case, it is defaulted that the confirmation message indicates that the virtual machine in the recent registration process has been successfully registered. In step 5220, the physical switch may also associate the virtual network card ID of the virtual machine with the virtual port ID assigned to the virtual machine and store the association in the storage device 3400 (see FIG. 3), such that in the subsequent packet forwarding process, the associated virtual network card ID may be searched based on the virtual port ID and the associated virtual port ID may be searched based on the virtual network card ID.

Subsequently, in step 5130, the confirmation message receiving module 2220 in the server 2000 (see FIG. 2) receives the confirmation message from the physical switch. In one embodiment, the confirmation message received by the confirmation message receiving module 2220 from the physical switch further comprises a virtual network card ID of the virtual machine, which indicates which virtual machine has been registered to the physical switch. The confirmation message may also not comprise a virtual network card ID. In such a case, it is defaulted that the confirmation message indicates that the virtual machine in the recent registration process has been successfully registered. In step 5130, the server 2000 may also associate the virtual network card ID of the virtual machine with the virtual port ID assigned to the virtual machine and store the association in the storage device 2300 (see FIG. 2), such that in the subsequent packet forwarding process, the associated virtual network card ID may be searched based on the virtual port ID and the associated virtual port ID may be searched based on the virtual network card ID. Through the above steps, registration of a new virtual machine may be implemented in the system according to the present invention.

Figure 6:
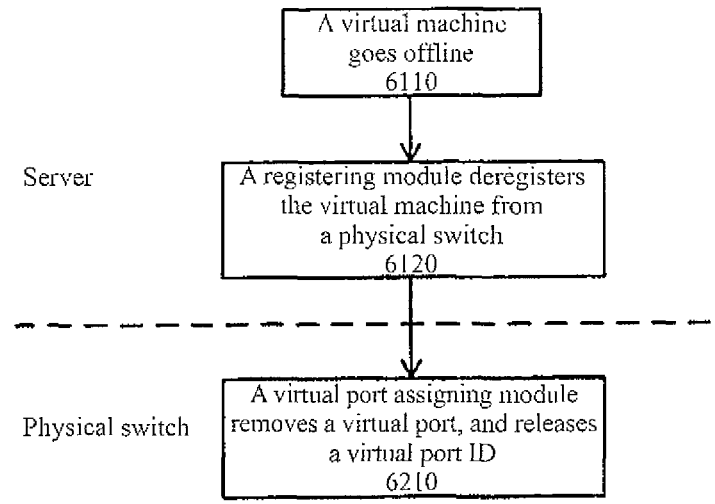
FIG. 6 is a flowchart of a deregistration process in a server and a physical switch according to an embodiment of the present invention.

FIG. 6 is a flowchart of a deregistration process in a server and a physical switch according to an embodiment of the present invention. As illustrated, in step 6110, a virtual machine in the server goes offline, or a virtual machine is deleted from the server. Subsequently, in step 6120, the registering module 2210 in the server 2000 (see FIG. 2) sends a deregistration message to the physical switch 3000 (see FIG. 3), which indicates a virtual machine to be deregistered. Subsequently, in step 6210, the virtual port assigning module 3100 in the physical switch 3000 (see FIG. 3) may, when receiving a deregistration message of the virtual machine, remove the virtual port associated with the virtual machine, and release the virtual port ID assigned to the virtual machine. Through the above steps, deregistration of a virtual machine may be implemented in the system according to the present invention.

Figures 7, 8:
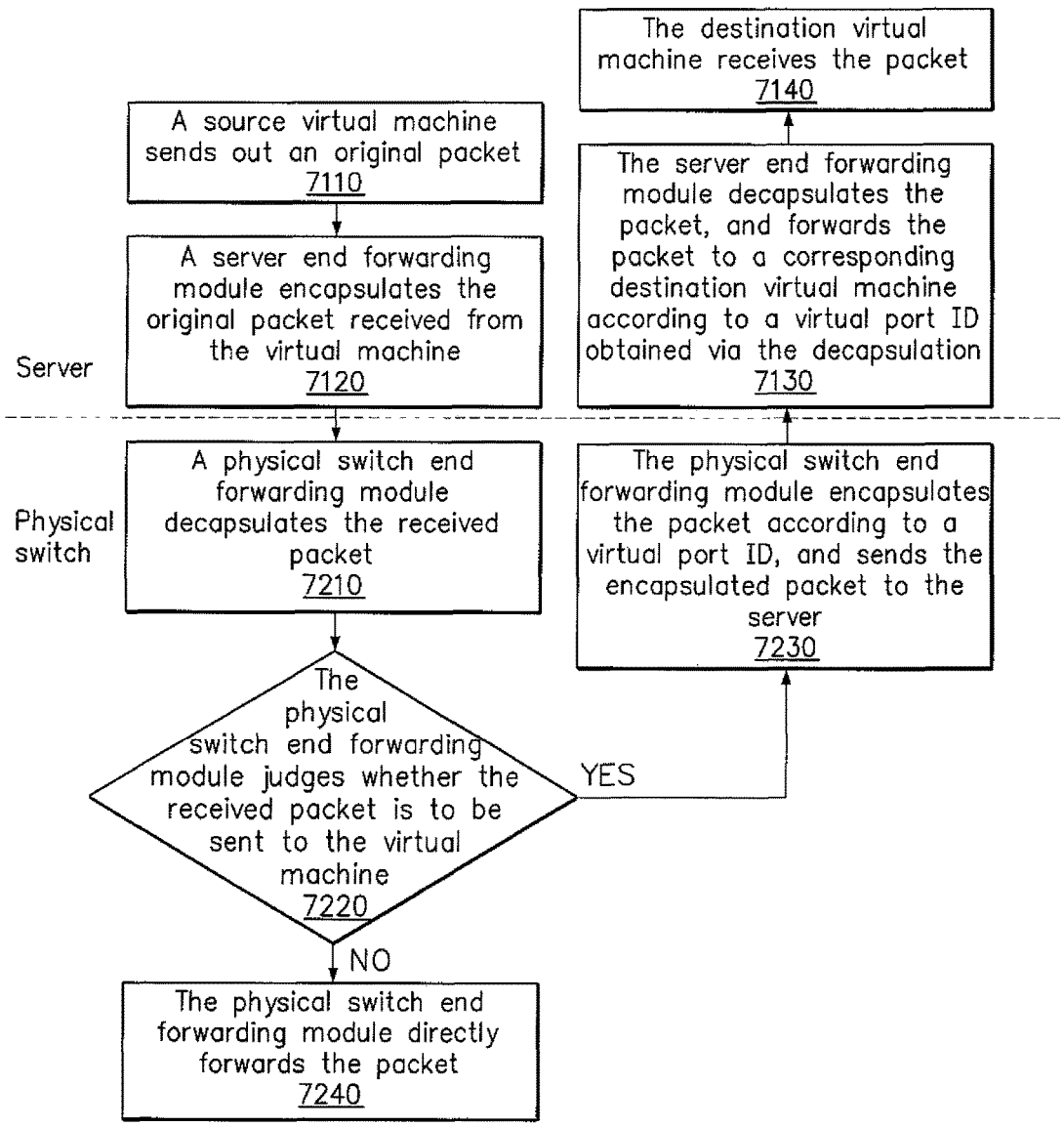
FIG. 7 is a flowchart of a packet forwarding process in a server and a physical switch according to an embodiment of the present invention.
FIG. 8 illustrates an example format of a registration message and a deregistration message according to an embodiment of the present invention.

FIG. 7 is a flowchart of a packet forwarding process in a server and a physical switch according to an embodiment of the present invention. In step 7110, a source virtual machine in the server 2000 (see FIG. 2) sends out an original packet.

Subsequently, in step 7120, the server end forwarding module 2230 encapsulates the original packet received from the source virtual machine, wherein the encapsulated packet comprises a virtual port ID assigned to the source virtual machine. In one embodiment, the server end forwarding module 2230 may search in the storage device 2300 to identify a virtual port ID associated with the virtual network card ID of the virtual machine, and then encapsulate the original packet based on the identified virtual port ID.

Subsequently, in step 7210, the physical switch end forwarding module 3300 (see FIG. 3) decapsulates the received packet.

Then, in step 7220, the physical switch end forwarding module 3300 judges whether the received packet is to be sent to the virtual machine. If it is judged in step 7220 that the packet is to be sent to the virtual machine, the process goes to step 7230. If it is judged in step 7220 that the packet is not to be sent to the virtual machine, the process goes to step 7240. In this manner, the physical switch 3000 may be connected to other network-connected devices, such as a personal computer, a smart phone, a PDA and the like, in addition to the server according to the present invention. Accordingly, the physical switch not only implements communication between the virtual machines on the server according to the present invention and communications between the servers, but also implements communication between the server according to the present invention and any network-connected devices.

Subsequently, in step 7230, the physical switch end forwarding module 3300 encapsulates the packet according to a virtual port ID of a destination virtual machine, and sends the encapsulated packet to the server. In step 7240, the physical switch end forwarding module 3300 directly forwards the packet.

Subsequently, in step 7130, the server end forwarding module 2230 decapsulates the packet, and forwards the packet to a corresponding destination virtual machine according to a virtual port ID obtained via the decapsulation. In one embodiment, the server end forwarding module 2230 may search in the storage device 2300 to identify a virtual network card ID associated with the virtual port ID, and then forward the packet to a corresponding destination virtual machine having the identified virtual network card ID. Finally, in step 7140, the destination virtual machine receives the packet. Through the above steps, forwarding of a packet may be implemented in the communication system according to the present invention.

FIG. 8 illustrates an example format of a registration message, deregistration message or confirmation message according to an embodiment of the present invention. As illustrated, the registration message, the deregistration message and the confirmation message may, for example, comprise a special destination MAC field, an operation code field, a virtual network card ID field, a virtual network card name field, a virtual port ID field and an encapsulation mode field. The special destination MAC field may be, for example, represented by all 1s or all 0s. The physical switch may determine the registration message, the de-registration message and the confirmation message according to the special destination MAC. The operation code field may be used to differentiate the registration message, the de-registration message and the acknowledgement message. For example, when the value of the operation code is 0, it may indicate that the message is a registration message; when the value of the operation code is 1, it may indicate that the message is a deregistration message; and when the value of the operation code is 2, it may indicate that the message is a confirmation message. The virtual network card ID field may be used to represent the virtual network card ID of either a registered or deregistered virtual machine. The virtual network card name may be used to represent the virtual network card name of either a registered or deregistered virtual machine.

The virtual port ID field may be used to represent a virtual port ID assigned to the virtual port of a virtual machine. The encapsulation mode field may be used to represent an encapsulation mode to be employed for packet forwarding between a server and a virtual switch. Herein, the encapsulation mode may be any one of MPLS, VLAN and a private format. The encapsulation mode field is not mandatory part of the format in FIG. 8. For example, if a default encapsulation mode is employed between the server and the physical switch, there is no need to define an encapsulation mode in the encapsulation mode field. In addition, the encapsulation mode may be defined by any one of the server and the physical switch. It should be noted that in the registration message, the virtual port ID field is null.

FIG. 9A and FIG. 9B illustrate a packet encapsulation structure according to an embodiment of the present invention. Specifically, FIG. 9A illustrates a structure of MPLS encapsulation and FIG. 9B illustrates a structure of VLAN encapsulation.

As illustrated in FIG. 9A, the MPLS encapsulation may comprise two layers of header fields, an MPLS header field, an IP header field, and a data field. The MPLS header field may comprise a tag field, a CoS field, an S field and a TTL field. According to the embodiments of the present invention, a virtual port ID may be added into the tag field in the MPLS header field. The CoS field is used to represent a service type. The S field is used to identity whether it is the bottom of the stack, which indicates that the MPLS tag may be nested. The TTL field is used to represent a time to live.

As illustrated in FIG. 9B, the VLAN encapsulation may comprise a destination address field, a source address field, an 802.1Q VLAN tag field, a type/length field, a data field and a frame check field. The 802.1Q VLAN tag field may comprise a tag protocol ID field, a user priority field, a standard format indicator field and a VLAN ID field. According to various embodiments of the present invention, a virtual port ID may be added into the VLAN ID field.

The MPLS encapsulation mode and the VLAN encapsulation mode are advantageous in that communication may be conducted between the server 2000 and the physical switch 3000 by using the conventional encapsulation mode, such that better compatibility with the server and the physical switch in the related art is achieved.

The present invention may be practiced as a system, a method and/or a computer program product. The computer program product may comprise a computer-readable storage medium which carries computer-readable program instructions which cause a processor to implement various aspects of the present invention.

The computer-readable storage medium may be a tangible device which is capable of retaining and storing instructions to be used by an instruction executing device. The computer-readable storage medium, for example, may be, but not limited to, an electric storage device, a magnetic storage device, an optical storage device, an electromagnetic storage device, a semiconductor storage device or any suitable combination of these devices. More specific examples (not the exhaustively listed examples) of the computer-readable storage medium include: a portable computer diskette, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk and a mechanical coding device such as a punched card or a concave groove convex structure where instructions are stored, and any suitable combination thereof. The computer-readable storage medium used herein shall not be interpreted as a transient signal, for example, a radio wave or other freely propagated electromagnetic wave, or an electromagnetic wave (for example, an optical pulse transmitted over an optical fiber cable) propagated via a wave guide or other transmission media or an electrical signal transmitted via an electrical wire. Furthermore, any program instruction or code that is embodied on such computer readable storage medium (including forms referred to as volatile memory) is, for the avoidance of doubt, considered "non-transitory".

The computer-readable program instructions described herein may be downloaded from the computer-readable storage medium to various computing/processing devices, or may be downloaded to an external computer or an external storage device via the Internet, a local area network, a wide area network and/or a wireless network. The network may involve a copper transmission cable, optical fiber transmission, wireless transmission, a router, a firewall, a switch, a gateway computer and/or an edge server. The network adapter card or the network interface in each computing/processing device receives computer-readable program instructions from the network, and forwards the computer-readable program instructions, such that the instructions are stored in the computer-readable storage medium in each computing/processing device.

The computer program instruction for performing the operations of the present invention may be a compiling instruction, an instruction set architecture (ISA) instruction, a machine instruction, a machine-related instruction, a micro code, a firmware instruction, state setting data or a source code or target code compiled by using any combination of one or more programming languages. The programming languages include object-oriented programming languages such as Smalltalk, C++ and the like, and routine progressive compiling languages such as the "C" language or the similar programming language. The computer-readable program instructions may be completely executed on a user's computer, or partially executed on a user's computer, or executed as an independent software package, or partially executed on a user's computer and partially executed on a remote computer, or completely executed on a remote computer or a server. In the scenario involving a remote computer, the remote computer may be connected to the user computer via any type of network, including a local area network (LAN) or a wide area network (WAN), or may be connected to an external computer (for example, connecting to the external computer via the Internet provided by an Internet service provider). In some embodiments, an electronic circuit is customized by using status information of the computer-readable program instructions, for example, a programmable logic circuit, a field programmable gate array (FPGA) or a programmable logic array (PLA). The electronic circuit may execute the computer-readable program instructions, thereby implementing various aspects of the present invention.

Various aspects of the present invention are described hereinafter with reference to the flowcharts and/or the block diagrams of the method, apparatus (system) and computer program product according to the embodiments of the present invention. It should be understood that each block in the flowcharts and/or the block diagrams, and any combination of the blocks in the flowcharts and/or the block diagrams may be implemented using computer-readable program instructions.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

These computer-readable program instructions may be issued to a universal computer, a dedicated computer, or processors of other programmable data processing apparatuses to generate a machine, which enables the computer or the processors of other programmable data processing apparatuses to execute the instructions to implement an apparatus for implementing the functions/actions specified in one or more blocks of the flowcharts and/or the block diagrams. Alternatively, these computer-readable program instructions may also be stored in the computer-readable storage medium. These instructions cause a computer, a programmable data processing device and/or other devices to work in a particular manner. As such, the computer-readable storage medium storing the instructions includes a manufactured article, which includes instructions for implementing various aspects of the functions/actions specified in the one or more blocks in the flowcharts and/or the block diagrams.

These computer-readable program instructions may also be loaded to a computer, other programmable data processing apparatus or other devices, such that a series of operations are performed on the computer, other programmable data processing apparatus or other devices for the process of computer implementation. As such, the instructions executed on the computer or other programmable data processing apparatuses or other devices are capable of providing an action of implementing the functions/operations specified in the one or more blocks of the flowcharts and/or the block diagrams.

The flowcharts and block diagrams in the accompanying drawings illustrate possibly practicable system architecture, functions and operations of the system, method and computer program product according to various embodiments of the present invention. Based on this, each block in the flowcharts or block diagrams may represent a module, a program segment or a portion of the instructions. The module, the program segment or the portion of the instructions comprises one or more executable instructions for implementing specified logic functions. It should be noted that in some alternative implementations, the functions specified in the blocks may also be implemented in a sequence different from that specified in the accompanying drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

Described above are exemplary embodiments of the present invention, which are illustrative but not exhaustive. The present invention is not limited to the above disclosed embodiments. Without departing from the scope and spirit defined in the embodiments, persons of ordinary skill in the art would find it obvious to make various modifications and variations. Selections of the terms in the specification are intended to best illustrate the principles, practical applications or improvements on the technology on the market of the various embodiments, or to make persons of ordinary skill in the art better understand various embodiments disclosed above.

What is claimed is:

1. A server, comprising:
one or more virtual machines; and
a proxy module in communication with the one or more virtual machines, wherein the proxy module comprises:
   a registering module configured to register the one or more virtual machines to a physical switch;
   a message receiving confirmation module configured to receive a confirmation message from the physical switch, wherein the confirmation message comprises identification information associated with the one or more virtual machines, and wherein the identification information includes a virtual port identifier assigned to the one or more virtual machines; and
   a server end forwarding module configured to communicate with the physical switch based on the identification information associated with the one or more virtual machines, wherein the server end forwarding module is further configured to encapsulate an original packet received from the virtual machine, wherein the encapsulated packet comprises the virtual port identifier assigned to the one or more virtual machines, wherein the confirmation message comprises information indicative of an encapsulation mode, and wherein the server end forwarding module encapsulates the original packet in the encapsulation mode indicated in the confirmation message.

2. The server of claim 1, wherein the registering module is configured to send a registration message comprising a virtual network card identifier to the physical switch, such that a virtual network card of the one or more virtual machines is registered to the physical switch through the virtual network card identifier.

3. The server of claim 2, wherein the confirmation message further comprises the virtual network card identifier of the virtual machine.

4. The server of claim 2, wherein the registering module is further configured to associate the virtual network card identifier of the virtual machine with the virtual port identifier assigned to the one or more virtual machines and store the association in a storage device.

5. The server of claim 1, wherein the server end forwarding module is further configured to decapsulate a packet received from the physical switch to obtain a virtual port identifier, and forward the decapsulated packet to a corresponding virtual machine based on the virtual port identifier obtained via the decapsulation.

6. The server of claim 1, wherein the encapsulation mode for encapsulating the original packet is selected from multiprotocol label switching, virtual local area network, and a private format.

7. A physical switch, comprising:
a virtual port assigning module configured to register a virtual machine to the physical switch, wherein the virtual port assigning module is configured to assign a virtual port to a virtual network card of the virtual machine;
a message sending confirmation module configured to send a confirmation message to a server, wherein the confirmation message comprises identification information associated with the virtual machine, wherein the identification information includes a virtual port identifier assigned to the virtual machine; and
a physical switch end forwarding module configured to communicate with the virtual machine based on the identification information associated with the virtual machine, wherein the virtual port assigning module is further configured to receive a registration message comprising the virtual network card identifier of the virtual network card from the server, and to associate the virtual network card identifier of the virtual machine with the virtual port identifier assigned to the virtual machine and store the association in a storage device.

8. The physical switch of claim 7, wherein the physical switch end forwarding module is further configured to, when a received packet is a packet to be sent to the virtual machine, encapsulate the packet based on the virtual port identifier of the virtual machine.

9. The physical switch of claim 7, wherein the confirmation message further comprises information indicative of an encapsulation mode.

10. A communication system, comprising:
a server and a physical switch in communication with the server,
wherein the server comprises:
one or more virtual machines; and
a proxy module in communication with the one or more virtual machines, wherein the proxy module comprises a registering module configured to register the one or more virtual machines to a physical switch, a message receiving confirmation module configured to receive a confirmation message from the physical switch, wherein the confirmation message comprises identification information associated with the one or more virtual machines, and a server end forwarding module configured to communicate with the physical switch based on the identification information associated with the one or more virtual machines, wherein the identification information includes a virtual port identifier assigned to the virtual machine, and wherein the registering module is configured to send a registration message comprising a virtual network card identifier to the physical switch, such that a virtual network card of the one or more virtual machines is registered to the physical switch through the virtual network card identifier; and
wherein the physical switch comprises:
a virtual port assigning module configured to register the one or more virtual machines to the physical switch, wherein the virtual port assigning module is configured to assign a virtual port to a virtual network card of the virtual machine based on a virtual network card identifier;
a message sending confirmation module configured to send a confirmation message to the server; and
a physical switch end forwarding module configured to communicate with the server based on the identification information associated with the one or more virtual machines.

11. The communication system of claim 10 wherein the server end forwarding module is further configured to encapsulate an original packet received from the virtual machine, wherein the encapsulated packet comprises the virtual port identifier assigned to the one or more virtual machines, and wherein the physical switch end forwarding module is further configured to, when a received packet is a packet to be sent to the virtual machine, encapsulate the packet based on the virtual port identifier assigned to the one or more virtual machines.

12. The communication system of claim 11, wherein the server end forwarding module is further configured to decapsulate a packet received from the physical switch to obtain a virtual port identifier, and forward the decapsulated packet to a corresponding virtual machine based on the virtual port identifier obtained via the decapsulation.

* * * * *